United States Patent
Kasap

(10) Patent No.: US 12,363,224 B2
(45) Date of Patent: Jul. 15, 2025

(54) VOICE BOT FOR SERVICE PROVIDERS

(71) Applicant: MICROSOFT TECHNOLOGY LICENSING, LLC, Redmond, WA (US)

(72) Inventor: Mustafa Kasap, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 411 days.

(21) Appl. No.: 18/078,500

(22) Filed: Dec. 9, 2022

(65) Prior Publication Data
US 2024/0195912 A1    Jun. 13, 2024

(51) Int. Cl.
| | |
|---|---|
| H04M 3/436 | (2006.01) |
| G10L 13/047 | (2013.01) |
| G10L 15/22 | (2006.01) |
| H04M 1/72436 | (2021.01) |
| H04M 1/72469 | (2021.01) |

(52) U.S. Cl.
CPC ........... *H04M 3/436* (2013.01); *G10L 13/047* (2013.01); *G10L 15/22* (2013.01); *H04M 1/72436* (2021.01); *H04M 1/72469* (2021.01); *H04M 2201/38* (2013.01); *H04M 2201/39* (2013.01); *H04M 2201/42* (2013.01)

(58) Field of Classification Search
CPC .. H04M 3/436; H04M 3/53383; H04M 3/527; H04M 1/72436; H04M 1/72469; H04M 2201/38; H04M 2201/39; H04M 2201/42; H04M 2203/252; H04M 2203/306; H04M 2203/357; G10L 13/047; G10L 15/22
See application file for complete search history.

(56) References Cited

U.S. PATENT DOCUMENTS

| | | | |
|---|---|---|---|
| 2004/0215451 A1 | 10/2004 | MacLeod | |
| 2012/0315880 A1* | 12/2012 | Peitrow | H04M 1/72513 455/412.1 |
| 2020/0178343 A1* | 6/2020 | Kim | H04W 76/27 |

FOREIGN PATENT DOCUMENTS

JP          09107398 A   *   4/1997

OTHER PUBLICATIONS

International Search Report and Written Opinion received for PCT Application No. PCT/US2023/035663 mailed on Jan. 26, 2024, 12 pages.

Fair, Lesley, "You Don't Say: FTC workshop listens in on voice cloning", Retrieved from; https://www.ftc.gov/business-guidance/blog/2019/11/you-dont-say-ftc-workshop-listens-voice-cloning, Nov. 4, 2019, 3 Pages.

(Continued)

*Primary Examiner* — Farid Seyedvosoghi
(74) *Attorney, Agent, or Firm* — Newport IP, LLC; Han Gim

(57) ABSTRACT

A device is configured to communicate on a mobile communications network. An incoming call is received, and it is determined that the incoming call meets a predetermined criteria indicating a probable source of the incoming call. On a display of the device, an option is rendered for answering the incoming call with a generated voice response in lieu of a voice of a user of the device. Text options for generating a voice response are also rendered. The incoming call is answered and generated speech corresponding to the selected text option is sent.

18 Claims, 9 Drawing Sheets

(56) References Cited

OTHER PUBLICATIONS

Kuksov, Igor, "Technologically advanced phone scams", Retrieved from: https://usa.kaspersky.com/blog/synthetic-voice-phone-fraud/12499/, Aug. 23, 2017, 9 Pages.

* cited by examiner

VOICE BOT FOR SERVICE PROVIDERS

BACKGROUND

Voice is often accepted as biometric data similar to a fingerprint or a photo and can thus be used as a biometric identifier. In many regions, restrictions have been established with regard to privacy concerns such as taking a person's photo or using a person's facial image without permission. However, similar restrictions are not typically provided for a person's voice, even though the person's voice can be used for identification (e.g., banks using voice as customer identifier to access online banking services). Moreover, new deepfake methods can take a brief voice clip and synthesize speech that mimics that of the sampled person's voice.

It is with respect to these considerations and others that the disclosure made herein is presented.

SUMMARY

There are many scenarios where a person's voice can be recorded and collected by third parties. For example, when a support line of a company is called, most support lines will start the call with a disclaimer such as "This call may be recorded for training purposes." And yet there are often no regulations on such data collection scenarios to prevent misuse of one's voice. Additionally, today there is a large amount of spam voice calls which can appear to be marketing activity. Some are blocked at the service operator level, but many are not identified and ultimately result in an incoming call. Many such calls are automated and do not respond unless the recipient responds with a voice prompt from the recipient. Such calls provide another opportunity for third parties to record a person's voice.

The disclosed embodiments describe technologies for providing a service which allows an end user to receive a call without having to speak the end user's own voice that can potentially be recorded. Such an end user may be a mobile phone user or a user of a communications platform such as MS Teams. In an embodiment, the end user's device is configured to receive a selection of a text-based label and render the selected text-based label for providing an audio reply message. The audio reply message is generated based on the selected text-based label and rendered for playback to the caller using synthetic speech, thus providing a synthesized voice response without exposing the end user's actual voice. For example, if a call is received from an unknown number that is potentially a solicitation or a marketing call, the end user's microphone can be auto muted, and the end user can reply by selecting a message presented on the screen of the end user's device to generate a synthesized voice response.

In an embodiment, the message is selected from a ranked list of messages or a user specified or selected list, and the selected message is played back to the caller using synthetic speech created by a synthetic speech generator. In an embodiment, the user can select a speech profile (e.g., male, female, accents, speed, etc.) as part of the user's settings and, during a call, the user can select a text message from a list at any time during the call, e.g., "Hi", "Yes", "No", "not interested," etc.

The techniques disclosed herein can improve security and privacy for users with mobile phones or other devices where the user can expose their voice. Other technical effects other than those mentioned herein can also be realized from implementations of the technologies disclosed herein.

BRIEF DESCRIPTION OF THE DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION OF ILLUSTRATIVE EMBODIMENTS

Figure 1:
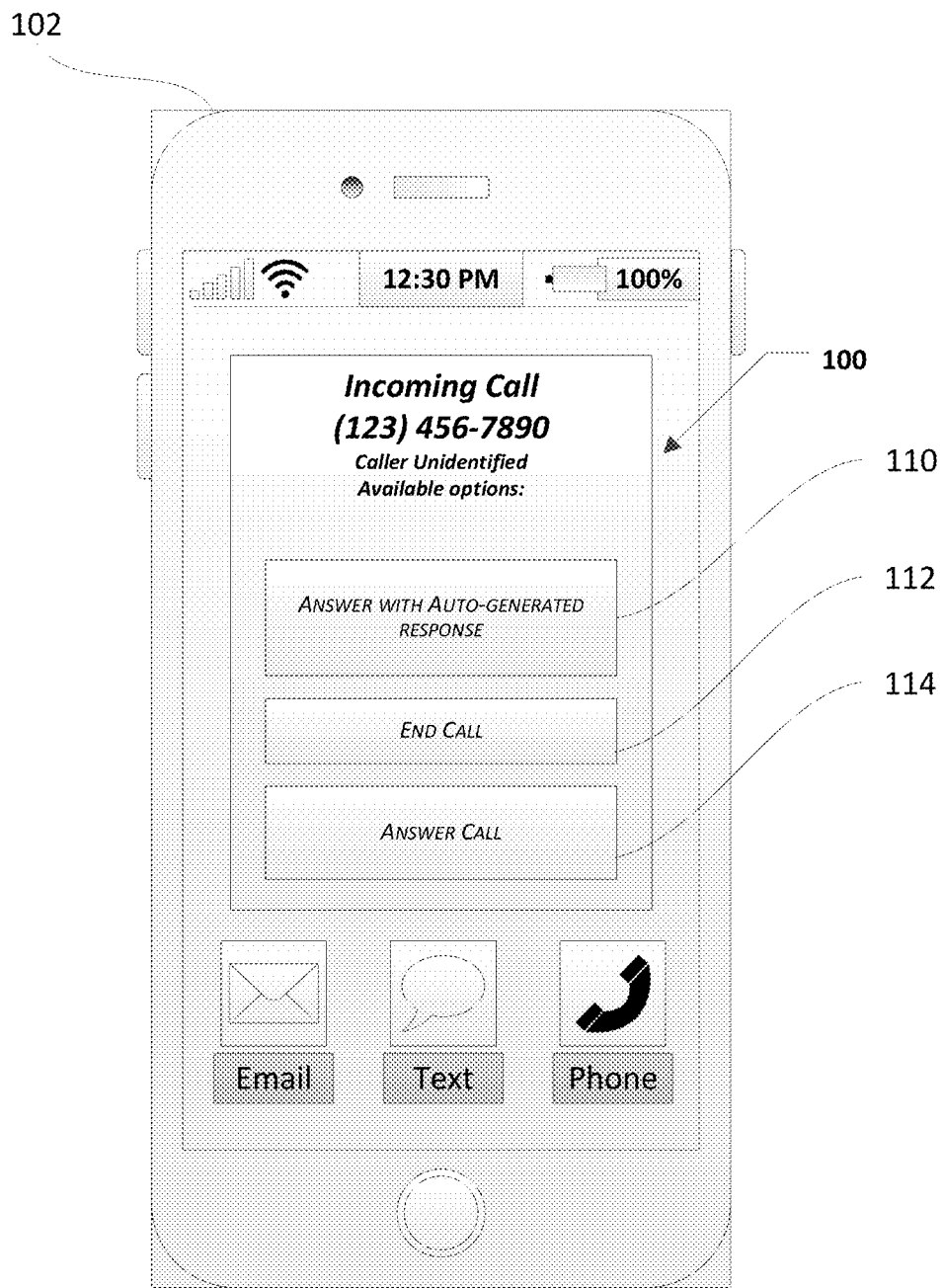
FIG. 1 depicts an example user interface illustrating an embodiment of the disclosure.

The disclosed embodiments enable an end user of a communications device to receive a voice call and respond to the voice call without using the end user's own voice. This allows the end user to avoid having the end user's own voice recorded by the caller. Such a communications device may be a mobile phone, tablet, laptop, or any other device that is capable of utilizing a communications network and utilizing voice services over a mobile network voice connection or a communications platform such as MS Teams.

In an embodiment, the end user's device is configured to render one or more text-based labels for pre-determined voice reply messages that can be selected by the end user. A pre-determined voice reply message is selected by the end user, and the selected voice reply message is synthesized and rendered for play back to the caller. The rendered voice response prevents exposure of the end user's actual voice while allowing for vocal engagement with the caller. For example, if a call is received from an unknown number that is potentially a company or a marketing entity, the end user's microphone can optionally be auto muted, and the end user can reply to the call by selecting a message presented on the screen of the end user's device.

The end user's microphone can be auto muted based on one or more factors. For example, the end user's microphone can be auto muted if it is determined that the incoming call is from an unknown source. This can be determined if, for example, the number for the incoming call is not recognized by the device or the service provider. If the number for the incoming call is in the user's address book or contact list, for example, then the device microphone will not be auto muted. In other embodiments, the device microphone will not be auto muted based on user settings and preferences. For example, a user can select an option to always auto-mute the microphone of incoming calls, or to only auto-mute incoming calls if the phone number of the incoming call is not recognized.

In an embodiment, the message is selected from a ranked list of messages or a user specified list, and the selected message is played back to the caller using synthetic speech created by a synthetic speech generator. In an embodiment, the list of messages is ranked according to a predetermined ranking criterion that can be based on a user preference, the context of the call, or other factors. In an embodiment, the user can select a speech profile (e.g., male, female, accents, speed, etc.) in the user's settings and/or during a call. The user can select a text message from a list at any time during the call, e.g., "Hi", "Yes", "No", "not interested," etc.

The disclosed embodiments can be implemented by an application embedded in the end user's device. For example, a device provider may embed such a function into the device's operating system. Alternatively, the mobile network operator or communications service provider can provide such a service to subscribers of the service.

Many 4G (LTE) and 5G services are delivered by software defined networks (SDNs). Cloud providers such as Azure for Operators provide core services for operators that enable the operators to deliver 5G-like mobile services. These services consist of various components each running in containers, some of which provide control plane functionality and others that provide user/data plane functions. These containers are typically distributed over cloud and edge locations depending on requirements for how close they need to be to the end user. One or more of these containers can be configured to provide the described functionality and provide a list of possible replies to the end user and receive a user selection over the control plane with minimal data bandwidth. Audio data can be synthesized, or a playback file can be selected from pre-generated files over the data plane. Having such files synthesized or pre-generated can reduce the need for audio data transmission between the end user device, the edge, and the cloud provider.

The described embodiments can also be implemented on communications platforms such as MSTeams. In an embodiment, the user may be allowed to select and send a pre-recorded message. For example, a user can select "Hello" from a list of messages that can be provided, for example, in a drop down menu or a pop-up menu. The system may send an identifier for the message, such as a message index number, rather than sending audio over the network. The receiving party receives the message index number and the corresponding message is rendered from a cache or audio database. This enables not only protection of the user's actual voice, but saves bandwidth by sending minimal metadata to identify a message rather than sending the audio binary.

In another embodiment, TextToSpeech synthesis services or other text-to-speech services can be embedded in the user's device. In an embodiment, rather than synthesizing the audio at the mobile core on the operator side, these messages can also be synthesized at the edge devices through i.e., Cortana, Siri, or Alexa-like engines or Text-ToSpeech engines.

In one embodiment, the caller's speech can be analyzed and its content can be identified. For example, the caller's speech can be converted to text using speech to text techniques. Artificial intelligence (AI) techniques such as natural language processing (NLP) and Generative Pre-trained Transformer (GPT) can be used to generate possible auto reply options that can be used to generate a reply text list.

Moreover, using a similar approach, the mobile operator can prevent or block the flow of audio streams from one endpoint to the other. Instead of transmitting the audio stream between endpoints, the speech originating from one endpoint can be converted into text and sent to the other endpoint. The original speech may be played back at the receiving endpoint by synthesizing the text and playing the synthetized voice at the receiving endpoint. In this way, the original source audio data is not allowed to reach the receiving endpoint. The service provider or operator can thus block biometric voice data flows and replace the biometric voice data flows with synthetic data, thus allowing for an additional way to protect user voice information.

The disclosed embodiments can be useful for enhancing privacy and security of user voice data when receiving unsolicited calls and avoiding the possibility of one's voice being recorded without permission.

The techniques described herein may be implemented for devices in communication with various wireless communications systems such as CDMA, TDMA, FDMA, OFDMA, and SC-FDMA. A CDMA system may implement radio technology such as CDMA2000, Universal Terrestrial Radio Access (UTRA), etc. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMA, etc. The techniques described herein may be used for the systems and radio technologies mentioned above as well as other systems and radio technologies. The description below, however, describes a cellular system for purposes of example, although the techniques are applicable beyond cellular applications.

The communications devices as used herein may refer to devices including, but not limited to, smartphones, cellular-enabled tablets and laptops, companion devices (e.g., smart watches), and non-consumer devices (telematics device in an automobile, cellular-connected utility meters), and the like.

Turning now to FIG. 1, illustrated is an example notification graphical user interface (GUI) 100 that can be presented on a computing device 102 to enable a user of the computing device 102 to select text-based labels for pre-determined audio reply messages. In the specifically illustrated embodiment, the notification GUI 100 is shown in the form of a notification that is displayed on the computing device 102 such as, for example, a smart phone, a tablet computer, a laptop computer, or any other mobile computing device. Additionally, or alternatively, the user may be notified that a call has been received via a desktop-computer based notification, an Internet-of-Things (IOT) notification, auxiliary device notification (e.g., a smartwatch may inform the user that a called has been received), or any other suitable technology.

In various embodiments, the notification GUI 100 may provide the user with a notification that a call is being received, and that the call is from an unknown number that is potentially a company or a marketing entity. In an embodiment, the end user's microphone can be auto muted. The user may be able to reply to the call by selecting a message presented on the notification GUI 100. For example, the notification GUI 100 may render one or more interface elements 110, 112, and 114 that are selectable by the user (e.g., via touch screen capabilities of the mobile device 102) to instruct the computing device 102 and/or the service provider to perform a specific action with respect to the selected voice reply message. In the illustrated example, a first user interface element 110 is shown that may be selected to answer the incoming call using the generated response as described herein. For example, as described above a call may be received from an unknown number that is potentially a solicitation or a marketing call. In one embodiment, the microphone of the computing device 102 is auto muted.

In one embodiment, as illustrated a second user interface element 112 is shown that may be selected by the user to end the call rather than to answer the call. In another embodiment, the user may be provided with an option to answer the call 114, for example if the user knows that the incoming call is in fact from a known caller.

Figure 2:
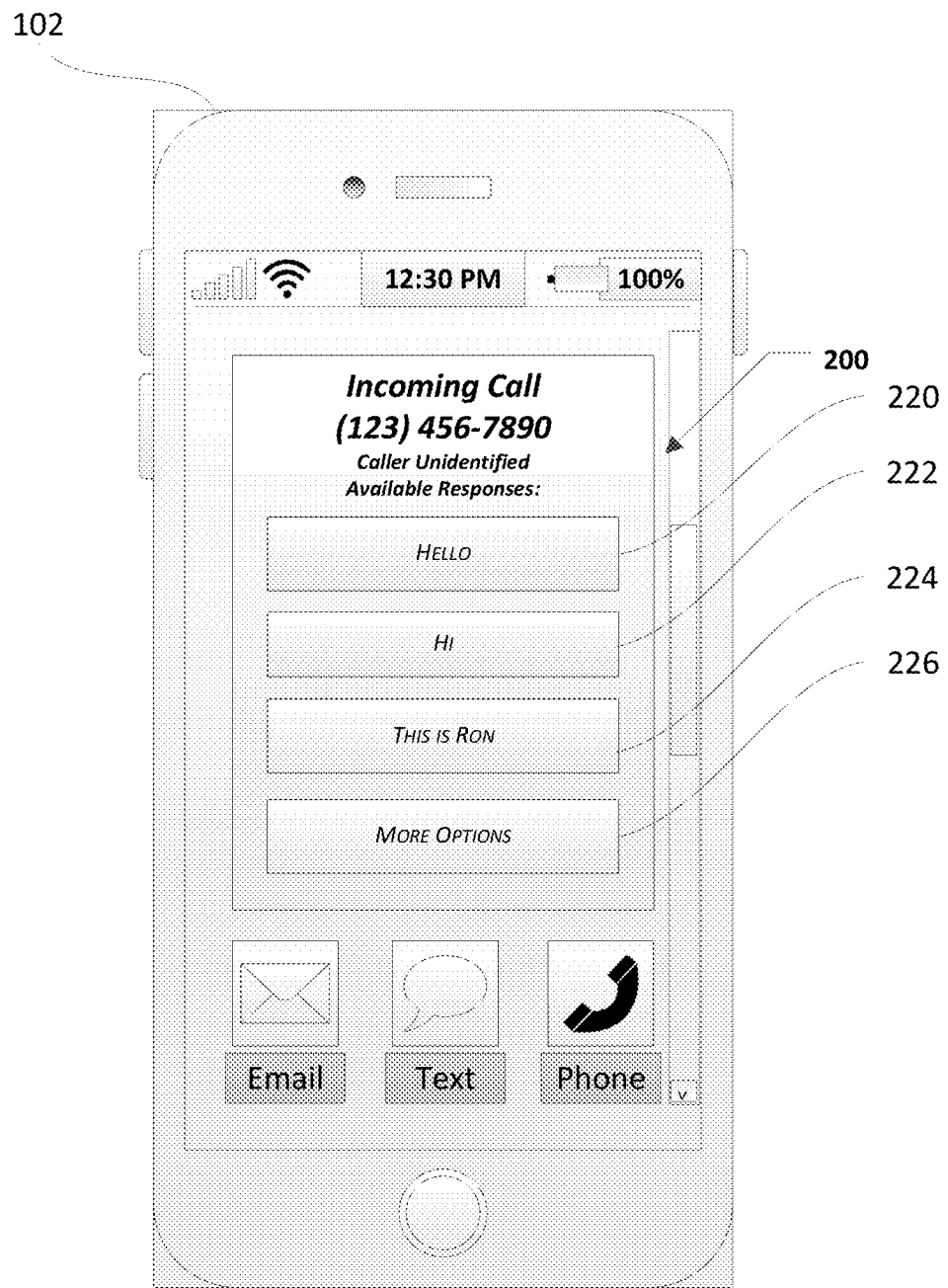
FIG. 2 depicts an example user interface illustrating an embodiment of the disclosure.

In an embodiment, if the first user interface element 110 is selected, the GUI 200 of FIG. 2 may be provided. As shown in FIG. 2, the notification GUI 200 may provide the user with various options for responding with a synthesized voice response. The user may be able to reply by selecting a message presented on the notification GUI 100. For example, the notification GUI 100 may render one or more interface elements 220, 222, 224, and 226 that are selectable by the user (e.g., via touch screen capabilities of the mobile device 102). In some embodiments, the message is selected from a ranked list of messages or a user specified list. The selected message is used to instruct the computing device 102 and/or the service provider to play back the selected message to the caller using synthetic speech created by a synthetic speech generator. In an embodiment, the synthetic speech may be generated using a speech profile (e.g., male, female, accents, speed, etc.) in the user's settings. In the illustrated example, a first user interface element 220 is shown that may be selected to generate "hello." In other examples, user interface element 222 is shown that may be selected to generate "hi," user interface element 224 is shown that may be selected to generate "this is Ron," and user interface element 226 is shown that may be selected to provide additional options.

Figure 3:
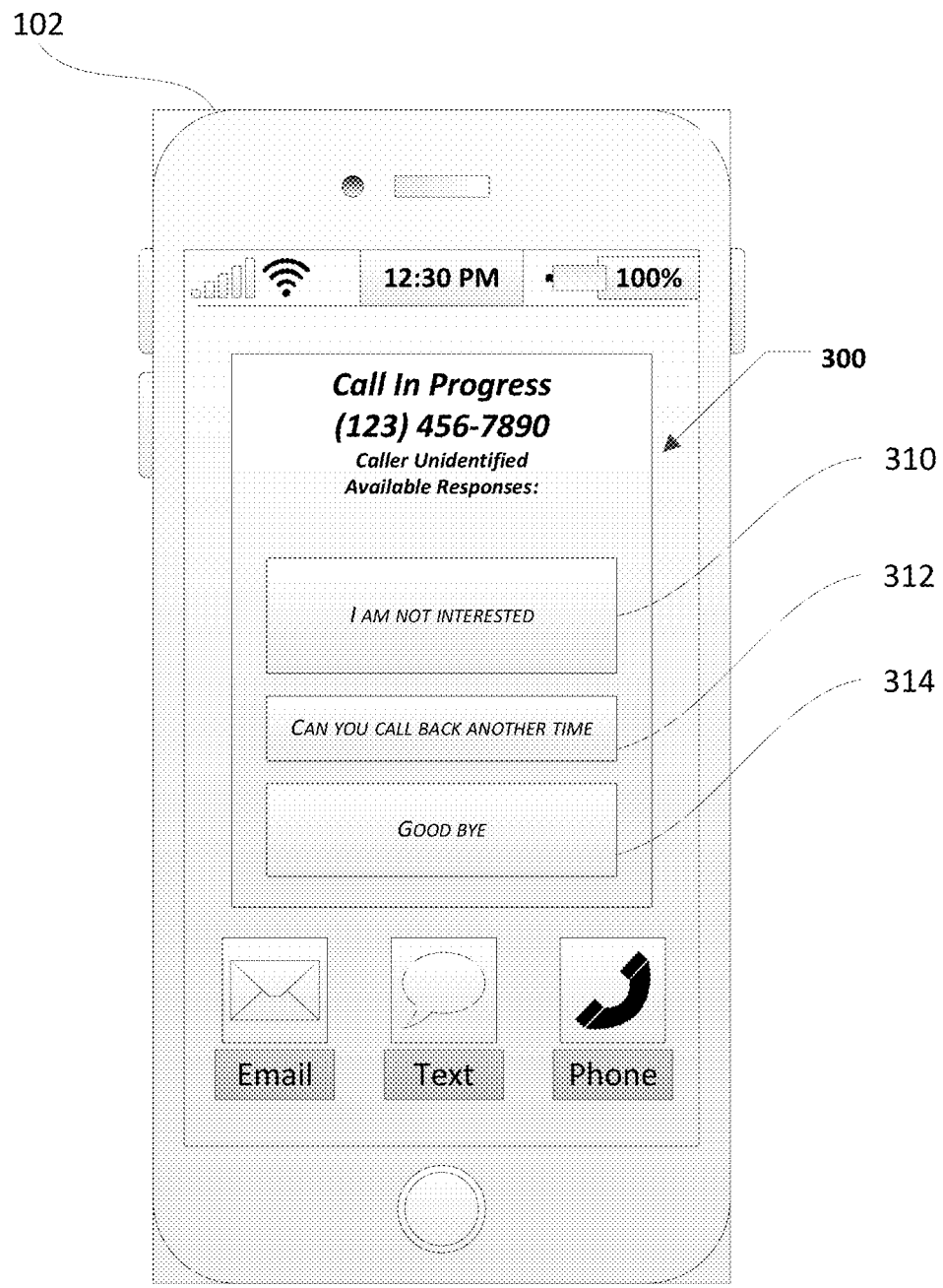
FIG. 3 depicts an example user interface illustrating an embodiment of the disclosure.

In an embodiment, if the user interface element 226 is selected to provide additional options, the GUI 300 of FIG. 3 may be provided. As shown in FIG. 3, the notification GUI 300 may provide the user with additional options for responding with a synthesized voice response. The user may be able to reply by selecting a message presented on the notification GUI 300. For example, the notification GUI 300 may render one or more interface elements 310, 312, and 314 that are selectable by the user (e.g., via touch screen capabilities of the mobile device 102). In the illustrated example, a first user interface element 310 is shown that may be selected to generate "I am not interested." In other examples, user interface element 312 is shown that may be selected to generate "Can you call back another time," and user interface element 314 is shown that may be selected to generate "Good bye."

Figure 4:
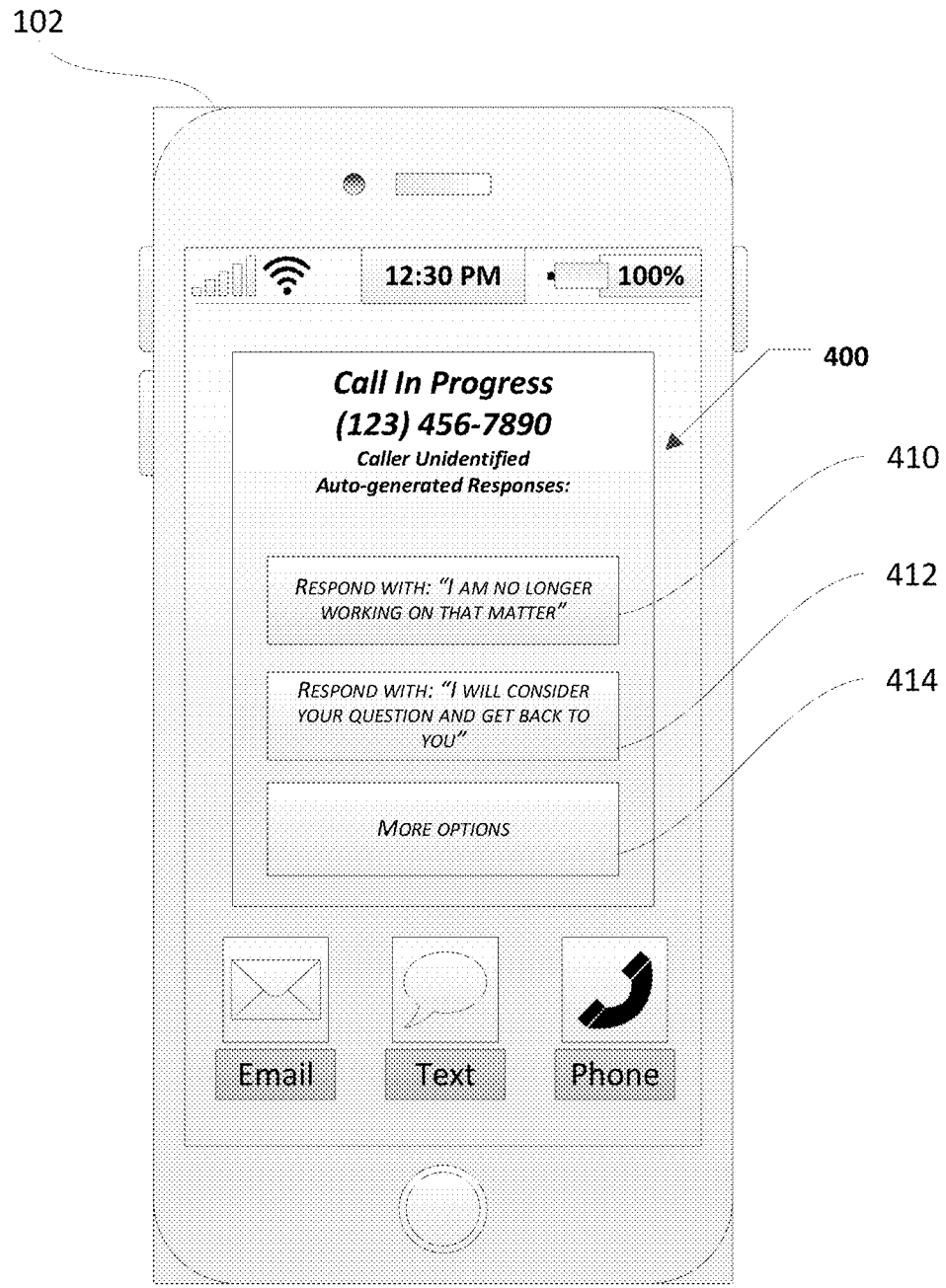
FIG. 4 depicts an example user interface illustrating an embodiment of the disclosure.

In an embodiment, additional suggestions for voice responses may be generated and presented to the user, such as that shown in the GUI 400 of FIG. 4. As shown in FIG. 4, the notification GUI 400 may provide the user with additional options for responding with a synthesized voice response, which can be generated based on an analysis of the information provided in the caller's voice content. For example, the caller's speech can be analyzed and converted to text using speech to text conversion techniques. AI techniques such as NLP and GPT can be used to generate possible auto reply options that can be used to generate a list of reply messages. The user may be able to reply by selecting a message presented on the notification GUI 400.

For example, the notification GUI 400 may render one or more interface elements 410, 412, and 414 that are selectable by the user (e.g., via touch screen capabilities of the mobile device 102). The selected message is used to instruct the computing device 102 and/or the service provider to play back the selected message to the caller using synthetic speech created by a synthetic speech generator. In the illustrated example, a first user interface element 410 is shown that may be selected to generate "I am no longer working on that matter." In other examples, user interface element 412 is shown that may be selected to generate "I will consider your question and get back to you," and user interface element 414 is shown that may be selected to generate additional options.

Figure 5:
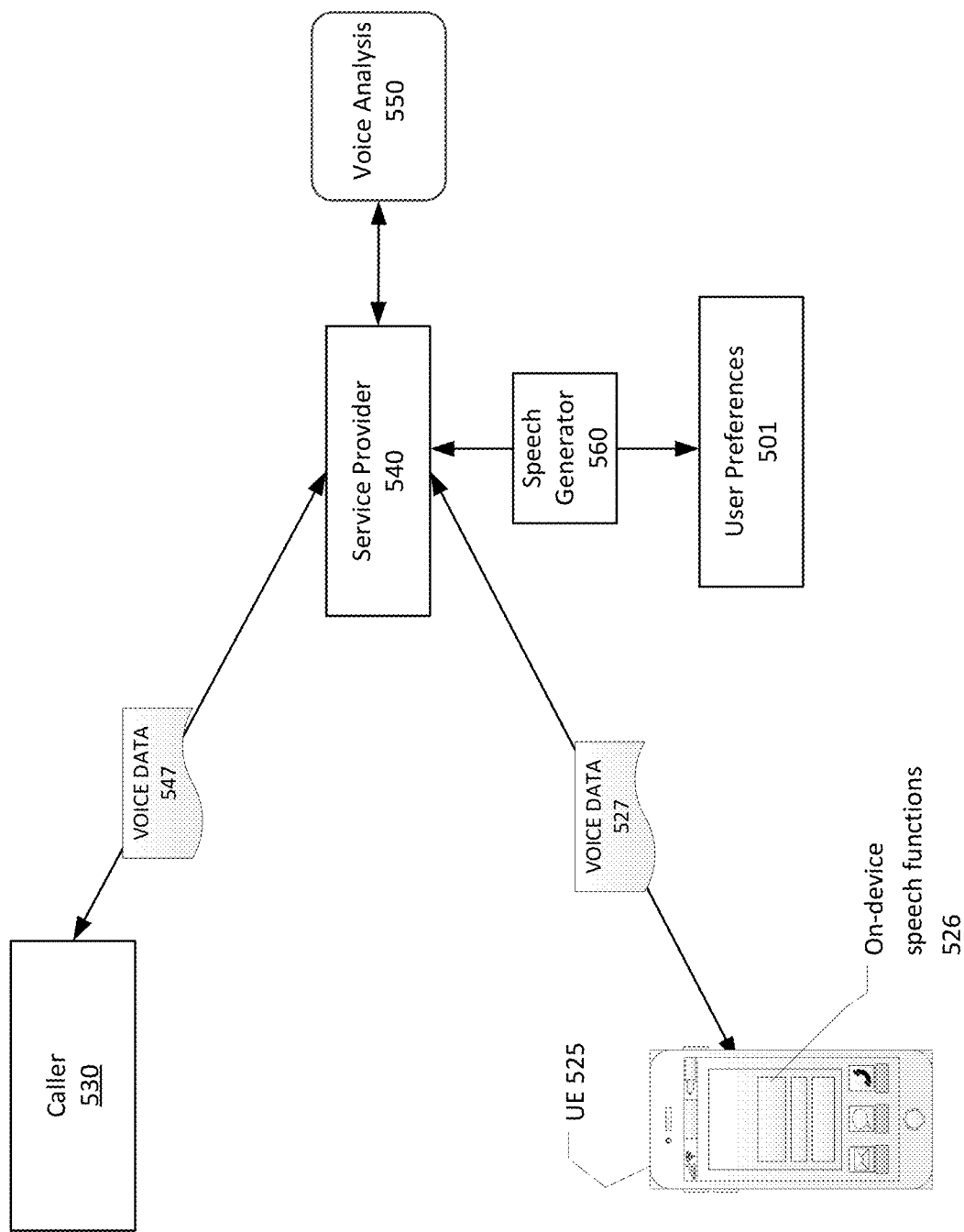
FIG. 5 depicts an example network illustrating an embodiment of the disclosure.

Referring to FIG. 5, illustrated is an example implementation of the present disclosure. In an embodiment, a user equipment (e.g., mobile device) UE 525 may receive voice data that originates from caller 530. The call session configuration and setup may be provided by service provider 540. The service provider 540 may provide voice analysis 550 and speech generator 560 to provide the functionality pertaining to voice synthesis as further described herein. The service provider 540 may further maintain user preferences 501 for how and when to generate synthetic voice data and how and when. In an embodiment, the UE 525 may run on-device speech functions 526 that enable on-device speech generation and other functionality as disclosed herein.

Figure 6:
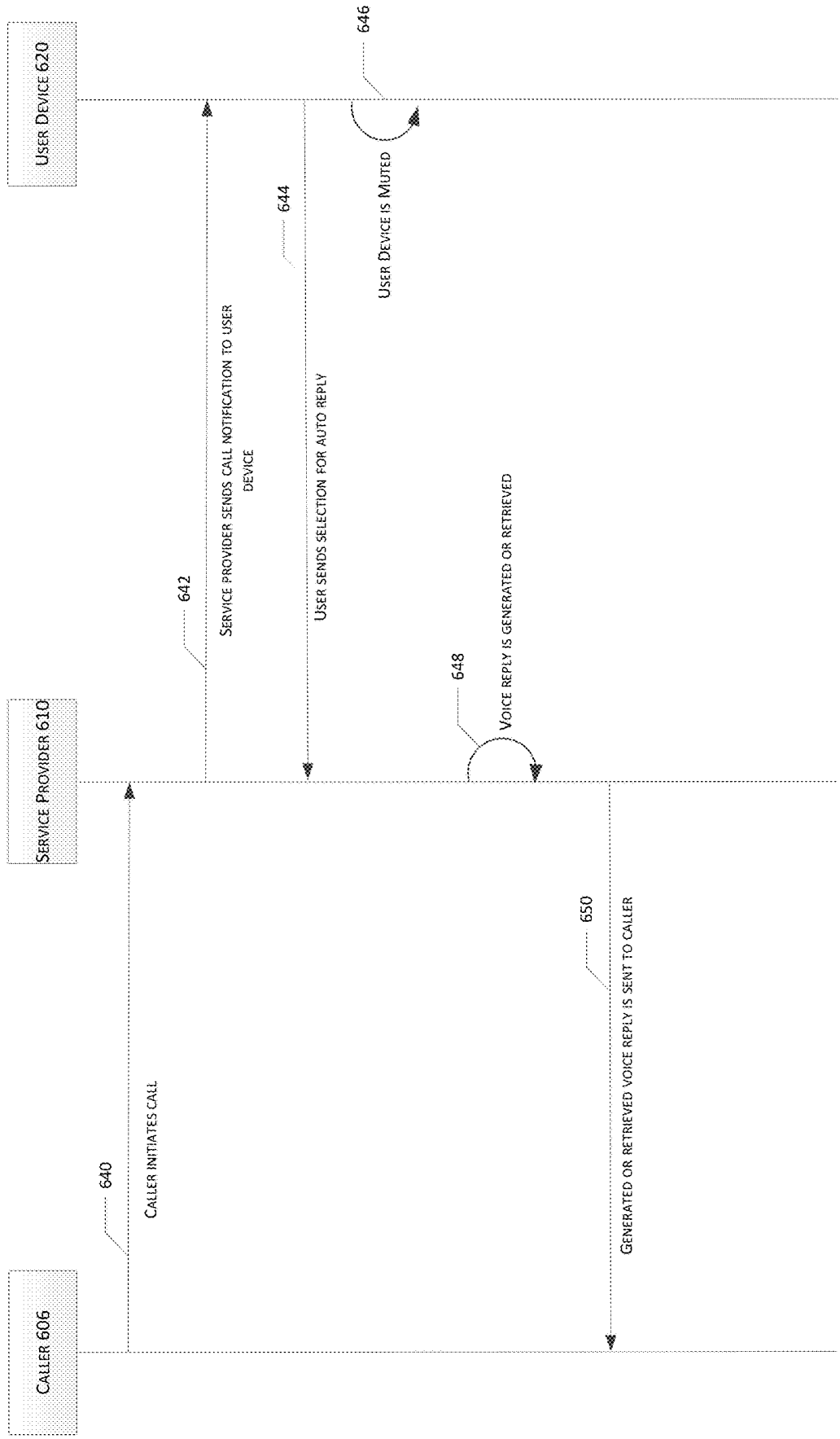
FIG. 6 depicts an example flow illustrating an embodiment of the disclosure.

FIG. 6 illustrates an example workflow according to one embodiment where the service provider provides the auto reply functionality. In an embodiment, a caller 606 initiates a call 640, which is received and processed by service provider 610. The service provider 610 sends 642 a notification of the call to the user device 620. If the user device 620 selects the option to receive the call and send a selection for auto reply 640, in some embodiments the user device is muted 646 to prevent the user's actual voice from being inadvertently sent on the network. The service provider 610 generates a voice reply 648 based on the selected auto reply. In some embodiments, the service provider 610 retrieves a corresponding voice reply from a database of voice replies. The service provider 610 sends the generated or retrieved voice reply 650 to the caller 606.

Figure 7:
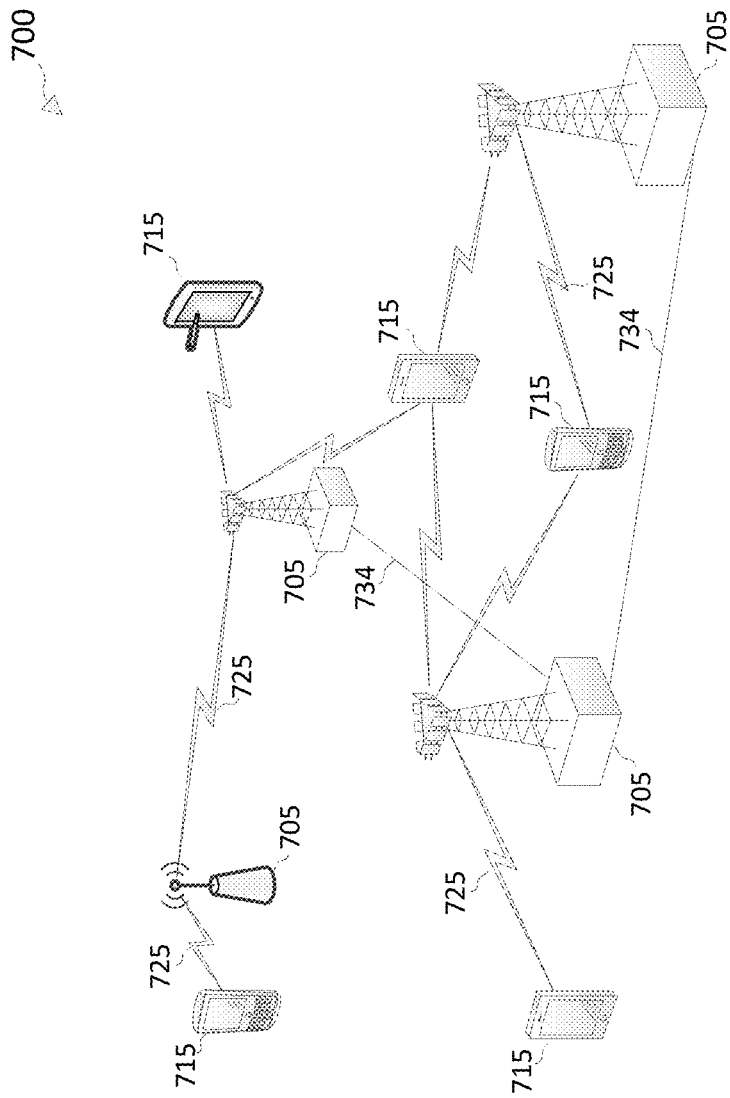
FIG. 7 depicts an example of a networked environment where aspects of the disclosure may be implemented.

FIG. 7 is a block diagram conceptually illustrating an example of a wireless communications system 700, in accordance with an aspect of the present disclosure. The wireless communications system 700 includes base stations (or cells) 705 and mobile devices 715. The base stations 705 may communicate with the mobile devices 715 under the control of a base station controller (not shown), which may be part of a core network or the base stations 705. The wireless communications system 700 may support operation on multiple carriers. Multi-carrier transmitters can transmit modulated signals simultaneously on the multiple carriers. For example, each communication link 725 may be a multi-carrier signal modulated according to the various radio technologies described above.

The base stations 705 may wirelessly communicate with the mobile devices 715 via one or more base station antennas. The base stations 705 sites may provide communication coverage for respective coverage areas. The mobile devices 715 may be located throughout the wireless communications system 700 and may be stationary or mobile. A mobile device 715 may also be referred to as user equipment (UE), mobile station, a mobile unit, a subscriber unit, remote unit, a mobile device, a wireless communications device, a remote device, a mobile terminal, a wireless terminal, a handset, a mobile client, a client, or other suitable terminology. A mobile device 715 may be a cellular phone, a wireless modem, a wireless communication device, a handheld device, a tablet computer, a laptop computer, or the like. The communication links 725 shown in the wireless communications system 700 may include uplink (UL) transmissions from a mobile device 715 to a base station 705, and/or downlink (DL) transmissions, from a base station 705 to a mobile device 715.

Figure 8:
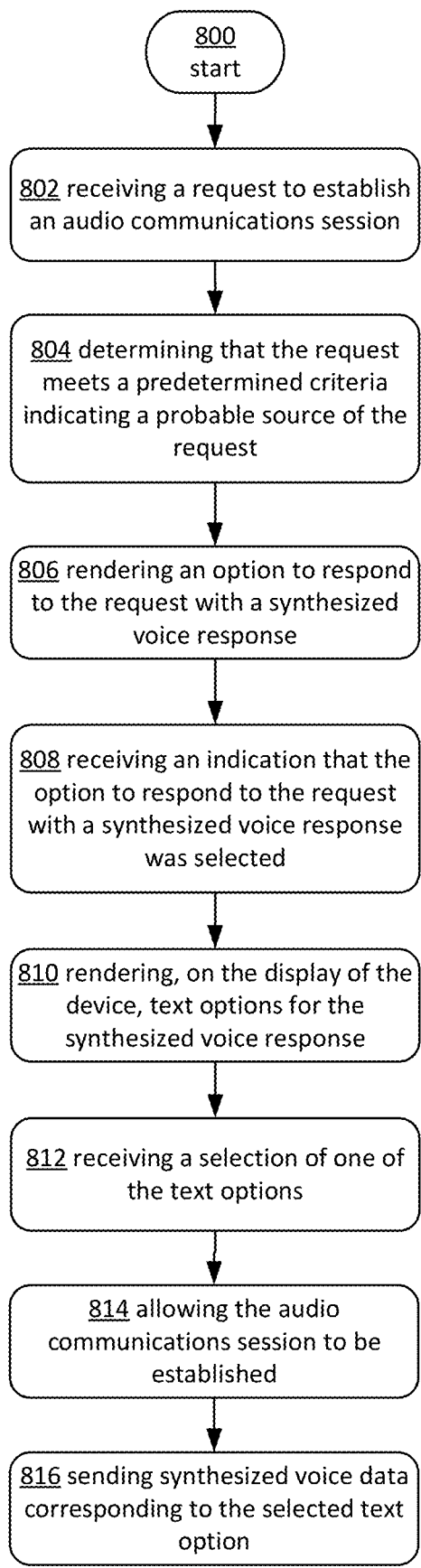
FIG. 8 depicts an operational procedure for provisioning of mobile devices.

FIG. 8 illustrates an example operational procedure for one embodiment of operating a device configured to communicate on a mobile communications network in accordance with this disclosure. In an embodiment, the plurality of computing devices are configured to communicate on a mobile communications network. In one example, the mobile communications network is operated, in part, by an edge computing network associated with a computing service provider. In an embodiment, the edge computing network comprises computing and storage devices configured to extend computing resources of the computing service provider. The computing devices and systems may have a memory that has stored thereon computer-executable instructions that, when executed, cause the computing device to perform operations as described.

Referring to FIG. 8, operation 800 begins the operational procedure. Operation 800 may be followed by operation 802. Operation 802 illustrates receiving a request to establish an audio communications session with the device.

Operation 802 may be followed by operation 804. Operation 804 illustrates determining that the request meets a predetermined criteria indicating a probable source of the request.

Operation 804 may be followed by operation 806. Operation 806 illustrates in response to determining that the request meets the predetermined criteria, rendering, on a display of the device, an option to respond to the request with a synthesized voice response.

Operation 806 may be followed by operation 808. Operation 808 illustrates receiving an indication that the option to respond to the request with a synthesized voice response was selected.

Operation 808 may be followed by operation 810. Operation 810 illustrates in response to receiving the indication that the option was selected, rendering, on the display of the device, text options for the synthesized voice response.

Operation 810 may be followed by operation 812. Operation 812 illustrates receiving a selection of one of the text options.

Operation 812 may be followed by operation 814. Operation 814 illustrates in response to receiving the selected text option, allowing the audio communications session to be established.

Operation 814 may be followed by operation 816. Operation 816 illustrates further in response to receiving the selected text option, sending synthesized voice data corresponding to the selected text option. In an embodiment, the synthesized voice data is sent in lieu of a spoken voice response from a user of the device.

Figure 9:
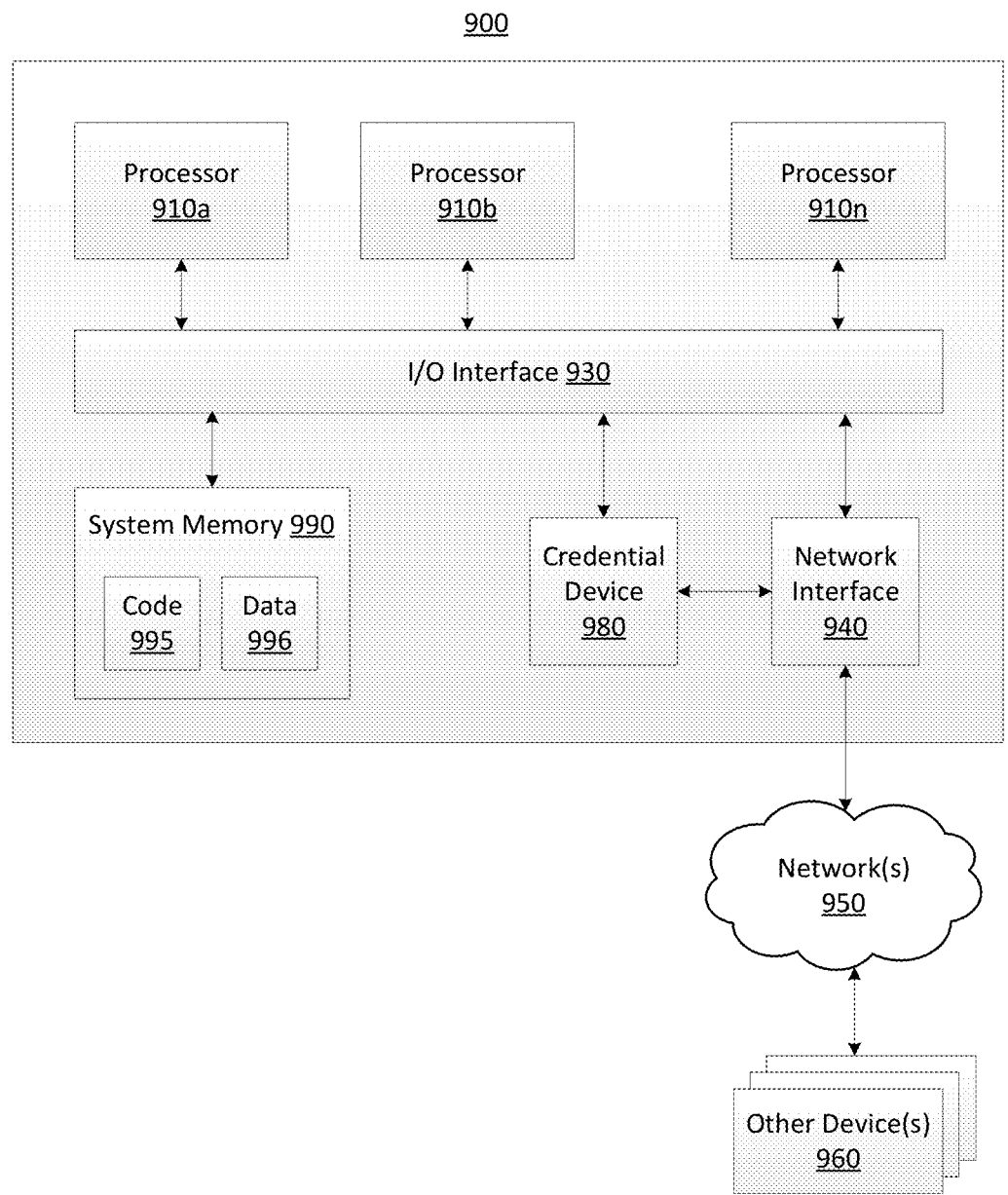
FIG. 9 depicts an example of a computing device where aspects of the disclosure may be implemented.

In at least some embodiments, a computing device that implements a portion or all of one or more of the technologies described herein may include a general-purpose computer system that includes or is configured to access one or more computer-accessible media. FIG. 9 illustrates such a general-purpose computing device 900. In the illustrated embodiment, computing device 900 includes one or more processors 910*a*, 910*b*, and/or 910*n* (which may be referred herein singularly as "a processor 910" or in the plural as "the processors 910") coupled to a system memory 990 via an input/output (I/O) interface 930. Computing device 900 further includes a network interface 940 coupled to I/O interface 930.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 990 may be configured to store instructions and data accessible by processor(s) 910. In various embodiments, system memory 990 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 990 as code 995 and data 996.

In one embodiment, I/O interface 990 may be configured to coordinate I/O traffic between processor 910, system memory 990, and any peripheral devices in the device, including network interface 940 or other peripheral interfaces. In some embodiments, I/O interface 990 may perform any necessary protocol, timing, or other data transformations to convert data signals from one component (e.g., system memory 990) into a format suitable for use by another component (e.g., processor 910). In some embodiments, I/O interface 990 may include support for devices attached through various types of peripheral buses, such as a variant of the Peripheral Component Interconnect (PCI) bus standard or the Universal Serial Bus (USB) standard, for example. In some embodiments, the function of I/O interface 990 may be split into two or more separate components, such as a north bridge and a south bridge, for example. Also, in some embodiments some or all of the functionality of I/O interface 990, such as an interface to system memory 990, may be incorporated directly into processor 910.

Network interface 940 may be configured to allow data to be exchanged between computing device 900 and other device or devices 960 attached to a network or network(s) 950, such as other computer systems or devices as illustrated herein, for example. In various embodiments, network interface 940 may support communication via any suitable wired or wireless general data networks, such as types of Ethernet networks, for example. Additionally, network interface 940 may support communication via telecommunications/telephony networks such as analog voice networks or digital fiber communications networks, via storage area networks such as Fibre Channel SANs, cellular voice and/or data networks, or via any other suitable type of network and/or protocol. When a network interface 940 provides cellular communication, its operation may be supported by a credential device 980 that may provide authentication, authorization, and other related information and services.

In some embodiments, system memory 990 may be one embodiment of a computer-accessible medium configured to store program instructions and data as described herein for FIGS. 1-7 for implementing embodiments of the corresponding methods and systems. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 900 via I/O interface 990. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 900 as system memory 990 or another type of memory. Portions or all of multiple computing devices, such as those illustrated in FIG. 9, may be used to implement the described functionality in various embodiments: for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices. For purposes of this specification and the claims, the phrase "computer-readable storage medium" and variations thereof, does not include waves, signals, and/or other transitory and/or intangible communication media.

The communications devices as used herein may refer to devices including, but not limited to, smartphones, cellular-enabled tablets and laptops, companion devices (e.g., smart watches), and non-consumer devices (telematics device in an automobile, cellular-connected utility meters, any of which may include some number of credential device(s) 980), and the like.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The disclosure presented herein also encompasses the subject matter set forth in the following clauses:

Clause 1: A method of operating a device configured to communicate on a mobile communications network, the method comprising:
receiving a request to establish an audio communications session with the device;
determining that the request meets a predetermined criteria indicating a probable source of the request;
in response to determining that the request meets the predetermined criteria, rendering, on a display of the device, an option to respond to the request with a synthesized voice response;
receiving an indication that the option to respond to the request with a synthesized voice response was selected;
in response to receiving the indication that the option was selected, rendering, on the display of the device, text options for the synthesized voice response;
receiving a selection of one of the text options: and
in response to receiving the selected text option:
allowing the audio communications session to be established: and
sending synthesized voice data corresponding to the selected text option,
wherein the synthesized voice data is sent in lieu of a spoken voice response from a user of the device.

Clause 2: The method of clause 1, wherein the predetermined criteria are indicative of a solicitation call.

Clause 3: The method of any of clauses 1-2, further comprising muting a microphone of the device in response to receiving the indication that the option was selected.

Clause 4: The method of any of clauses 1-3, further comprising muting a microphone of the device in response to:
receiving the indication that the option was selected: and
determining that the request is associated with a contact of the user.

Clause 5: The method of any of clauses 1-4, wherein the text options are ranked based on a ranking criterion.

Clause 6: The method of any of clauses 1-5, wherein the voice response is generated using Generative Pre-trained Transformer (GPT).

Clause 7: The method of any of clauses 1-6, wherein the synthesized voice data is generated on the device.

Clause 8: The method of any of clauses 1-7, wherein the synthesized voice data is generated by a service provider for the communications session.

Clause 9: The method of any of clauses 1-8, further comprising analyzing voice input from the communications session and identifying content of the communications session.

Clause 10: The method of any of clauses 1-9, further comprising generating the text options based on the identified content of the communications session.

Clause 11: A system comprising:
a memory storing thereon instructions that when executed by a processor of the system, cause the system to perform operations comprising:
receiving a request for a communications session;
determining that the request meets a predetermined criteria indicating a probable source of the request;
in response to determining that the request meets the predetermined criteria, rendering, on a display, an option to answer the request with a generated voice response;
in response to receiving the option, rendering, on the display, text options for generating a voice response: and
in response to receiving a selected text option, answering the request for the communications session and sending generated speech corresponding to the selected text option, wherein the generated speech is sent in lieu of a spoken voice response from a user of the system.

Clause 12: The edge computing network of clause 11, wherein the predetermined criteria are indicative of a solicitation call.

Clause 13: The edge computing network of any of clauses 11 and 12, wherein the voice response is generated at the system.

Clause 14: The edge computing network of any of clauses 11-13, wherein the voice response is generated by a service provider for the communications session.

Clause 15: A computer-readable storage medium having computer-executable instructions stored thereupon which, when executed by one or more processors of a device, cause the device to perform operations comprising:
receiving an incoming call for the device;
determining that the incoming call meets a predetermined criteria indicating a probable source of the incoming call;
in response to determining that the incoming call meets the predetermined criteria, rendering, on a display of the device, an option to respond to the incoming call with a synthesized voice response;
in response to receiving the option to respond to the incoming call with the synthesized voice response, rendering, on the display of the device, text options for generating the synthesized voice response; and
in response to receiving a selected text option, answering the incoming call and sending generated speech corresponding to the selected text option, wherein the generated speech is sent in lieu of a spoken voice response from a user of the device.

Clause 16: The computer-readable storage medium of clause 15, wherein the predetermined criteria is indicative of a solicitation call.

Clause 17: The computer-readable storage medium of any of clauses 15 and 16, further comprising computer-executable instructions stored thereupon which, when executed by one or more processors of a device, cause the device to perform operations comprising muting a microphone of the device in response to receiving the option and a further criterion.

Clause 18: The computer-readable storage medium of any of the clauses 15-17, wherein the text options are ranked based on a ranking criterion.

Clause 19: The computer-readable storage medium of any of the clauses 15-18, further comprising computer-executable instructions stored thereupon which, when executed by one or more processors of a device, cause the device to perform operations comprising analyzing voice input from the incoming call and identifying content of the incoming call.

Clause 20: The computer-readable storage medium of any of the clauses 15-19, further comprising computer-executable instructions stored thereupon which, when executed by one or more processors of a device, cause the device to perform operations comprising generating the text options based on the identified content of the incoming call.

What is claimed is:

1. A method of operating a device configured to communicate on a mobile communications network, the method comprising:
receiving a request to establish an audio communications session with the device;
determining that the request meets a predetermined criteria indicating a probable source of the request;
in response to determining that the request meets the predetermined criteria, rendering, on a display of the device, an option to respond to the request with a synthesized voice response;

receiving an indication that the option to respond to the request with a synthesized voice response was selected;
in response to receiving the indication that the option was selected, rendering, on the display of the device, text options for the synthesized voice response;
receiving a selection of one of the text options;
in response to receiving the selected text option:
allowing the audio communications session to be established; and
sending synthesized voice data corresponding to the selected text option,
wherein the synthesized voice data is sent in lieu of a spoken voice response from a user of the device; and
muting a microphone of the device in response to:
receiving the indication that the option was selected; and
determining that the request is not associated with a contact of the user.

2. The method of claim 1, wherein the predetermined criteria are indicative of a solicitation call.

3. The method of claim 1, further comprising muting a microphone of the device in response to receiving the indication that the option was selected.

4. The method of claim 1, wherein the text options are ranked based on a ranking criterion.

5. The method of claim 1, wherein the voice response is generated using Generative Pre-trained Transformer (GPT).

6. The method of claim 1, wherein the synthesized voice data is generated on the device.

7. The method of claim 1, wherein the synthesized voice data is generated by a service provider for the communications session.

8. The method of claim 1, further comprising analyzing voice input from the communications session and identifying content of the communications session.

9. The method of claim 8, further comprising generating the text options based on the identified content of the communications session.

10. A system comprising:
a memory storing thereon instructions that when executed by a processor of the system, cause the system to perform operations comprising:
receiving a request for a communications session;
determining that the request meets a predetermined criteria indicating a probable source of the request;
in response to determining that the request meets the predetermined criteria, rendering, on a display, an option to answer the request with a generated voice response;
in response to receiving the option, rendering, on the display, text options for generating a voice response;
in response to receiving a selected text option, answering the request for the communications session and sending generated speech corresponding to the selected text option, wherein the generated speech is sent in lieu of a spoken voice response from a user of the system; and
muting a microphone of the system in response to:
receiving the option; and
determining that the request is not associated with a contact of the user.

11. The system of claim 10, wherein the predetermined criteria are indicative of a solicitation call.

12. The system of claim 10, wherein the voice response is generated at the system.

13. The system of claim 10, wherein the voice response is generated by a service provider for the communications session.

14. A non-transitory computer-readable storage medium having computer-executable instructions stored thereupon which, when executed by one or more processors of a device, cause the device to perform operations comprising:
receiving an incoming call for the device;
determining that the incoming call meets a predetermined criteria indicating a probable source of the incoming call;
in response to determining that the incoming call meets the predetermined criteria, rendering, on a display of the device, an option to respond to the incoming call with a synthesized voice response;
in response to receiving the option to respond to the incoming call with the synthesized voice response, rendering, on the display of the device, text options for generating the synthesized voice response;
in response to receiving a selected text option, answering the incoming call and sending generated speech corresponding to the selected text option, wherein the generated speech is sent in lieu of a spoken voice response from a user of the device; and
muting a microphone of the device in response to:
receiving the option; and
determining that the incoming call is not associated with a contact of the user.

15. The non-transitory computer-readable storage medium of claim 14, wherein the predetermined criteria is indicative of a solicitation call.

16. The non-transitory computer-readable storage medium of claim 10, wherein the text options are ranked based on a ranking criterion.

17. The non-transitory computer-readable storage medium of claim 14, further comprising computer-executable instructions stored thereupon which, when executed by one or more processors of a device, cause the device to perform operations comprising analyzing voice input from the incoming call and identifying content of the incoming call.

18. The non-transitory computer-readable storage medium of claim 17, further comprising computer-executable instructions stored thereupon which, when executed by one or more processors of a device, cause the device to perform operations comprising generating the text options based on the identified content of the incoming call.

* * * * *